(12) United States Patent
Wang et al.

(10) Patent No.: US 8,534,617 B2
(45) Date of Patent: Sep. 17, 2013

(54) SUPPORT APPARATUS FOR DEVICE

(75) Inventors: Ting-Kai Wang, New Taipei (TW); Xiao-Guang Cheng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 68 days.

(21) Appl. No.: 13/278,086

(22) Filed: Oct. 20, 2011

(65) Prior Publication Data
US 2013/0037682 A1 Feb. 14, 2013

(30) Foreign Application Priority Data

Aug. 11, 2011 (CN) .......................... 2011 1 0229916

(51) Int. Cl.
G06F 1/16 (2006.01)
(52) U.S. Cl.
USPC ........... 248/127; 248/371; 248/917; 248/919; 248/921; 248/922; 361/679.02

(58) Field of Classification Search
USPC ............ 248/371, 127, 188.6, 346.01, 346.03, 248/346.04, 346.06, 917, 919, 922, 921; 361/679.02
See application file for complete search history.

(56) References Cited

U.S. PATENT DOCUMENTS

| | | | | |
|---|---|---|---|---|
| 5,100,098 A | * | 3/1992 | Hawkins | 248/291.1 |
| 5,836,565 A | * | 11/1998 | Chang | 248/456 |
| 6,256,075 B1 | * | 7/2001 | Yang | 348/843 |
| 6,776,385 B1 | * | 8/2004 | Chang | 248/448 |
| 7,708,240 B2 | * | 5/2010 | Homer et al. | 248/130 |
| 2006/0146487 A1 | * | 7/2006 | Huang | 361/681 |

* cited by examiner

*Primary Examiner* — Anita M King
(74) *Attorney, Agent, or Firm* — Altis Law Group, Inc.

(57) ABSTRACT

A support apparatus for supporting a device includes a fixing portion detachably secured to the device, and a rotating portion rotatably coupled to the fixing portion. The fixing portion defines an opening for allowing the support apparatus to be hand-held, and, when placed on a supporting surface, is capable of being rotated to form different viewing angles for the device. A device assembly using the support apparatus is also provided.

14 Claims, 3 Drawing Sheets

SUPPORT APPARATUS FOR DEVICE

BACKGROUND

1. Technical Field

The present disclosure relates to a support apparatus for a device.

2. Description of Related Art

Hand-held electronic devices, such as PDAs, and panel computers, are widely used. However, many hand-held devices do not have a support apparatus if a user wants to set their device down on a surface, such as a table, to watch movies or read e-books.

Therefore, there is room for improvement in the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the embodiments. Moreover, in the drawings, like reference numerals designate corresponding parts throughout the three views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
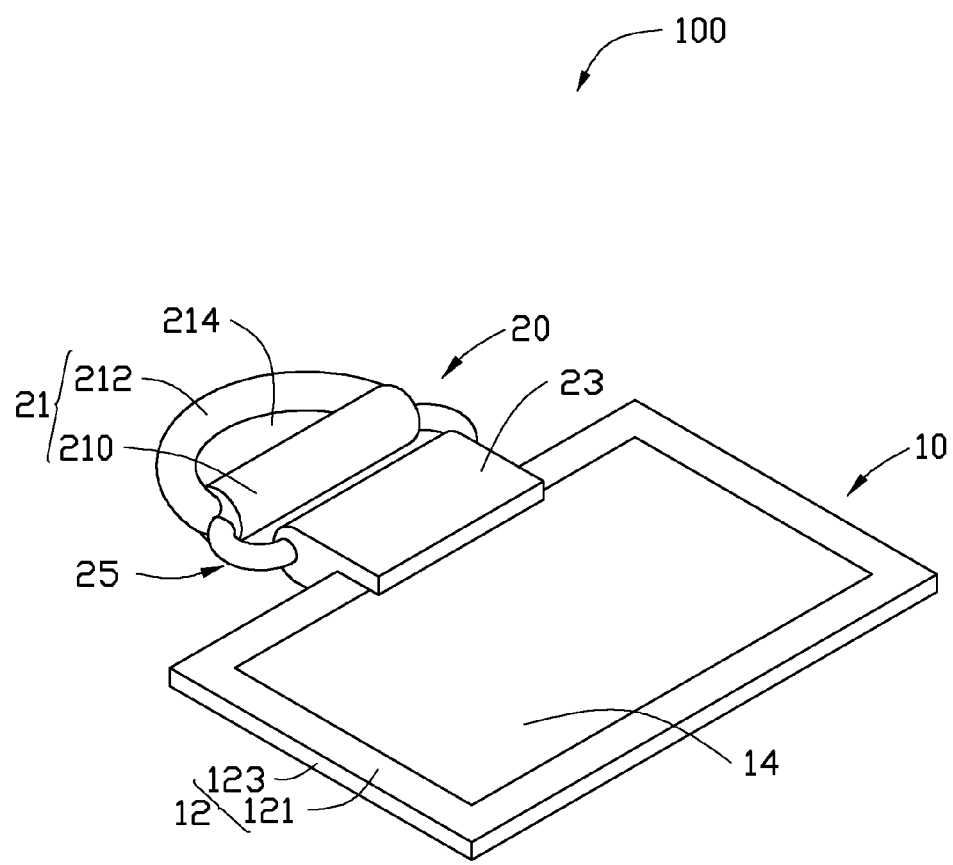
FIG. 1 is a perspective view of a device assembly in accordance with an embodiment; the electronic device assembly includes a device and a support apparatus for supporting the device.

Referring to FIG. 1, a device assembly 100 including a device 10 and a support apparatus 20 for supporting the device 10 in accordance with an embodiment is shown. The device 10 may be a panel computer, a personal digital assistant (PDA) or the like. The support apparatus 20 is detachably coupled to the device 10 and is capable of supporting the device 100 on a surface, such as a table.

Figure 2:
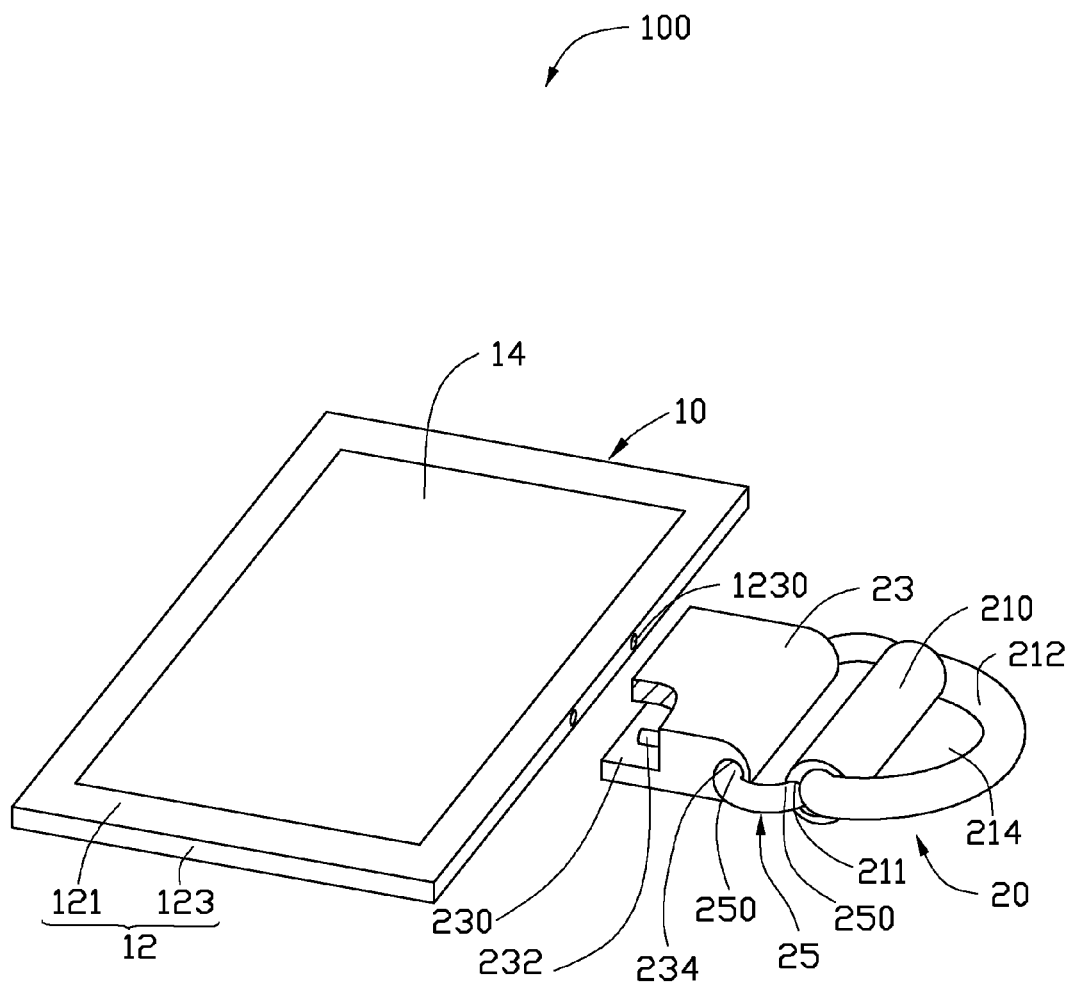
FIG. 2 is a view of the device assembly of FIG. 1 partially disassembled.

Referring also to FIG. 2, the device 10 includes a housing 12 and a display 14 mounted on the housing 12. The housing 12 is substantially rectangular, and includes a front wall 121, a rear wall (not labeled), and four sidewalls 123. The front wall 121 cooperates with the rear wall and the sidewalls 123 to define a receiving space (not shown) for receiving the components of the device 10. The display 14 is mounted on the front wall 121, and may be a touch sensitive display. Two limiting holes 1230 are evenly spaced and defined on one of the sidewalls 123.

The support apparatus 20 includes a rotating portion 21, a fixing portion 23, and a connecting portion 25 for connecting the rotating portion 21 to the fixing portion 23. The fixing portion 23 is detachably coupled to the housing 12. An end of the fixing portion 23 defines a receiving slot 230. The width of the receiving slot 230 is such as to provide a close fit with the device 10, and the fixing portion 23 is thus stably secured to the device 10 by means of the receiving slot 230. Two limiting posts 232 are arranged at the bottom of the receiving slot 230. The limiting posts 232 correspond to the two limiting holes 1230 and prevent the fixing portion 23 sliding along the side of the housing 12. The other end of the fixing portion 23 opposite to the receiving slot 230 defines a fixing hole 234 for receiving the connecting portion 25.

The connecting portion 25 is substantially elliptic, and includes two rods 250 (a first rod and a second rod) parallel to and not enclosing each other. The connecting portion 25 is fixed to the fixing portion 23 by the first rods 250 being received in the fixing hole 234 of the fixing portion 23.

The rotating portion 21 is substantially D-shaped, and includes a cylindrical post 210 rotatably coupled to the connecting portion 25 and a supporting member 212 fixed at each end of the cylindrical post 210. The cylindrical post 210 defines a through hole 211 extending longitudinally, for rotatably receiving the second rod 250. The diameter of the through hole 211 is almost the same as the diameter of the second rod 250, such that friction is present to hinder the smooth and free rotation of the cylindrical post 210. The supporting member 212 is substantially C-shaped, and defines an opening 214 for allowing the fingers of a user to pass therethrough to hold the support apparatus 20.

In assembly, first, the connecting portion 25 is fixed to the fixing portion 23 by the first rod 250 being received in the fixing hole 234. Second, the rotating portion 21 is rotatably coupled to the connecting portion 25 by the through hole 211 rotatably receiving the second rod 250. Third, the receiving slot 230 receives an end of the housing 12 with the limiting posts 232 being received in the corresponding limiting holes 1230. By these means, the support apparatus 20 is secured to the device 10.

When the device 10 is to be used, users can hold the support apparatus 20 by passing fingers through the opening 214, and the device 10 can thus be held in a convenient and stable manner.

Figure 3:
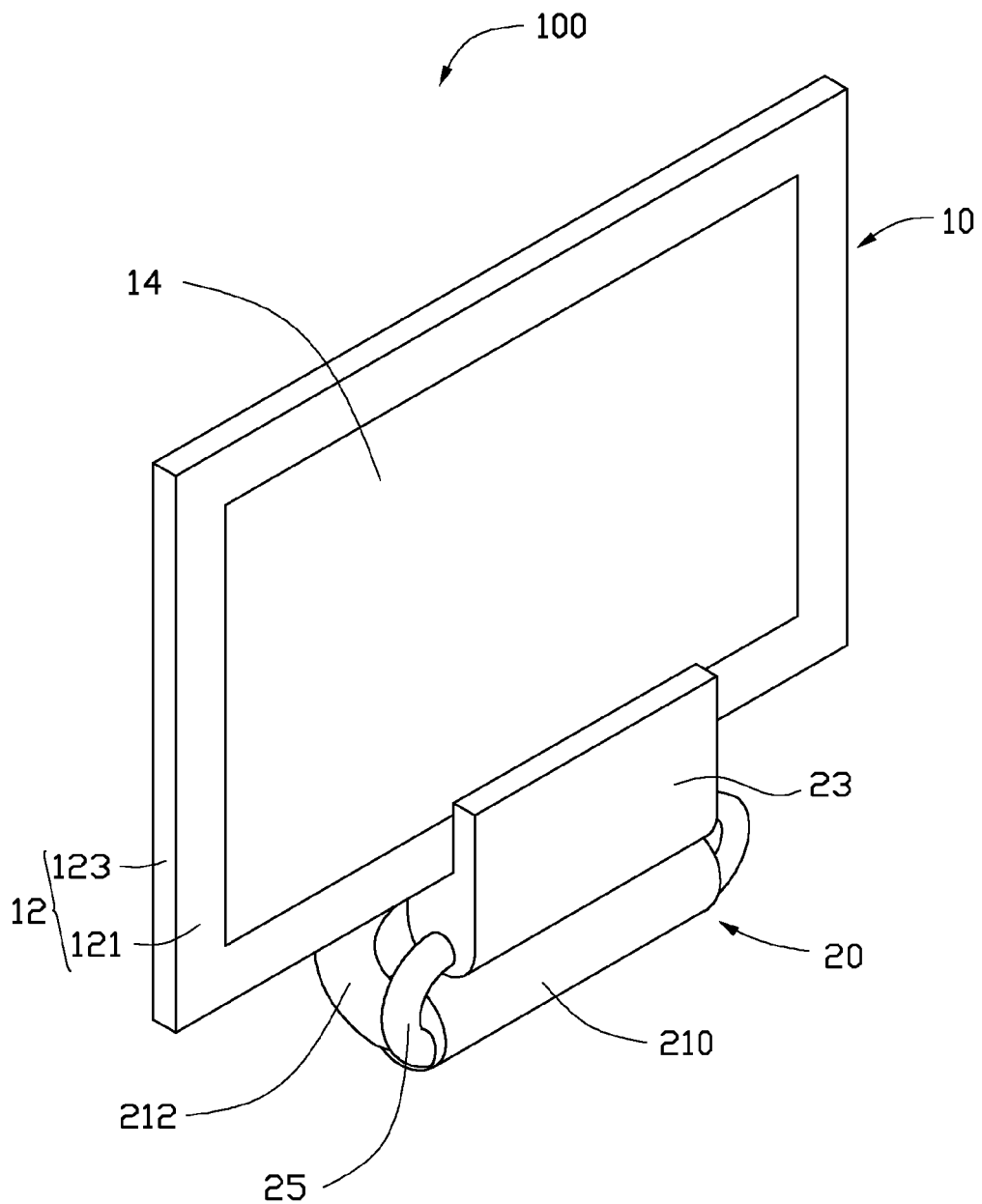
FIG. 3 is a view showing the support apparatus supporting the device of FIG. 1.

Referring to FIG. 3, when the device 10 is placed on a surface, such as a table: the rotating portion 21 is rotated to form an acute angle with the device 10, and the support apparatus 20 functions as a bracket to support the device 10 on the surface. Furthermore, the rotating portion 21 can also be rotated to form different angles with the device 10, and the viewing angle of the device 10 is thus adjustable.

With the assistance of the support apparatus 20, the device 10 is capable of standing on its own on many surfaces, which is convenient.

Even though information and the advantages of the present embodiments have been set forth in the foregoing description, together with details of the structures and functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A support apparatus for a device, comprising:
   a fixing portion detachably secured to the device; and
   a rotating portion rotatably coupled to the fixing portion and defining an opening for allowing the support apparatus to be hand-held;
   wherein the rotating portion is capable of being rotated to form different angles with the device, and supports the device on a surface with view angle of the device being adjustable;
   wherein the support apparatus further comprises a connecting portion for connecting the rotating portion with the fixing portion; the connecting portion comprises a first rod and a second rod, the second rod is parallel to and not enclosed by the first rod, the connecting portion is fixed to the fixing portion by the first rod, and the rotating portion is rotatably coupled to the second rod.

2. The support apparatus of claim 1, wherein the fixing portion defines a receiving slot for receiving an end of the device.

3. The support apparatus of claim 2, wherein the width of the receiving slot is such as to provide a close fit with the device, and the fixing portion is thus stably secured to the device by the receiving slot.

4. The support apparatus of claim 3, wherein at least one limiting post is arranged at the bottom of the receiving slot.

5. The support apparatus of claim 4, wherein a sidewall of the device defines at least one limiting hole, the at least one limiting hole corresponds to and receives the at least one limiting post.

6. The support apparatus of claim 1, wherein the rotating portion comprises a cylindrical post and a supporting member fixed to opposite ends of the cylindrical post and defining the opening, the cylindrical post defines a through hole for rotatably receiving the second rod.

7. The support apparatus of claim 6, wherein the diameter of the through hole is almost the same as the diameter of the second rod, such that friction is present to hinder the smooth and free rotation of the cylindrical post.

8. A device assembly, comprising:
a device; and
a support apparatus for supporting the device, the supporting apparatus comprising:
  a fixing portion detachably secured to the device; and
  a rotating portion rotatably coupled to the fixing portion and defining an opening for allowing the support apparatus to be hand-held;
wherein the rotating portion is capable of being rotated to form different angles with the device, and the support apparatus functions as a bracket to support the device on a surface with view angle of the device being adjustable;
wherein the support apparatus further comprises a connecting portion; the connecting portion comprises a first rod and a second rod parallel to the first rod, the connecting portion is fixed to the fixing portion by the first rod; the rotating portion comprises a cylindrical post and a supporting member fixed to opposite ends of the cylindrical post and defining the opening, the cylindrical post defines a through hole for rotatably receiving the second rod.

9. The device assembly of claim 8, wherein the fixing portion defines a receiving slot for receiving an end of the device.

10. The device assembly of claim 9, wherein the width of the receiving slot is such as to provide a close fit with the device, and the fixing portion is thus stably secured to the device by the receiving slot.

11. The device assembly of claim 10, wherein at least one limiting post is arranged at the bottom of the receiving slot.

12. The device assembly of claim 11, wherein a sidewall of the device defines at least one limiting hole, the at least one limiting hole corresponds to and receives the at least one limiting post.

13. The device assembly of claim 9, further comprising a connecting portion for connecting the rotating portion with the fixing portion, wherein the connecting portion is fixed to an end of the fixing portion opposite to the receiving slot.

14. The device assembly of claim 8, wherein the diameter of the through hole is almost the same as the diameter of the second rod, such that friction is present to hinder the smooth and free rotation of the cylindrical post.

* * * * *